United States Patent [19]

Bosschaerts et al.

[11] Patent Number: 5,884,013
[45] Date of Patent: Mar. 16, 1999

[54] AUTOTYPICAL SCREENING WITH OPTIMISED DOTSHAPE

[75] Inventors: Jacobus Bosschaerts; Johan Vanhunsel; Jan Van Cauwenberge; Paul Delabastita, all of Mortsel, Belgium

[73] Assignee: Agfa-Gevaert, Mortsel, Belgium

[21] Appl. No.: 747,940

[22] Filed: Nov. 12, 1996

[30] Foreign Application Priority Data

Nov. 17, 1995 [DE] Germany .............................. 95203148.2

[51] Int. Cl.⁶ ............................ H04N 1/405; H04N 1/23; G06K 15/02
[52] U.S. Cl. ........................ 395/109; 358/459; 358/298; 347/131
[58] Field of Search ................................ 395/109; 358/459, 358/456, 534, 536, 298; 382/237; 347/131, 254

[56] References Cited

U.S. PATENT DOCUMENTS 3,742,129  6/1973  Roberts et al. .
3,922,484  11/1975  Keller .
5,155,598  10/1992  Ramekers et al. ...................... 358/459

FOREIGN PATENT DOCUMENTS 0620673  10/1994  European Pat. Off. .
2098022  11/1982  United Kingdom .
2105144  3/1983   United Kingdom .

Primary Examiner—Scott Rogers
Attorney, Agent, or Firm—Baker & Botts, L.L.P.

[57] ABSTRACT

A method for generating a screened reproduction of a multiple tone image comprises the steps of autotypical or amplitude modulation screening the multiple tone image to obtain screened data representing tones of the multiple tone image in terms of halftone dots; reproducing the halftone dots on an imaging element by means of a scan-wise exposure by means of a laser or a LED, wherein in extreme regions of the tone scale the shape of the halftone dots is compact, characterized in that the halftone dots have a ratio of peripheral length to surface area which is minimal.

16 Claims, 15 Drawing Sheets

FAST SCAN

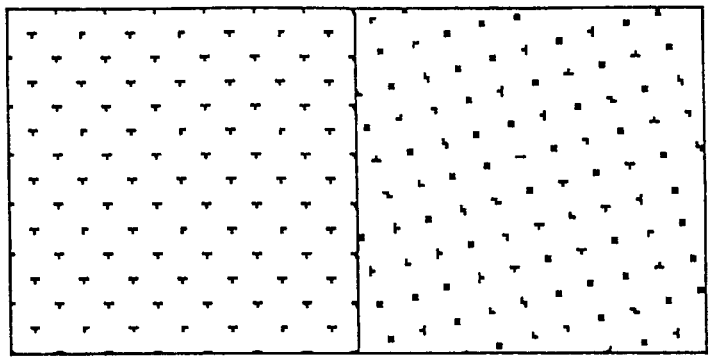
FIG. 4.1.a    FIG. 4.1.b
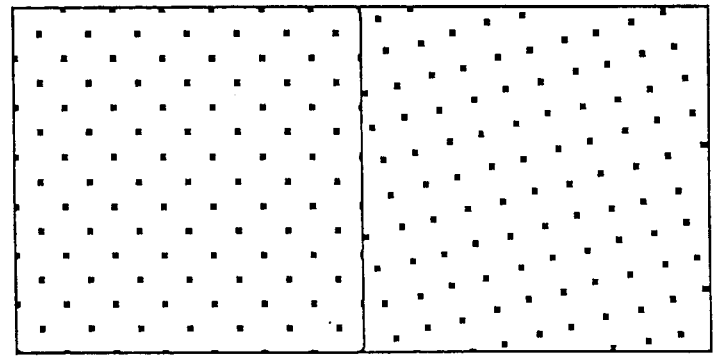
FIG. 4.2.a    FIG. 4.2.b

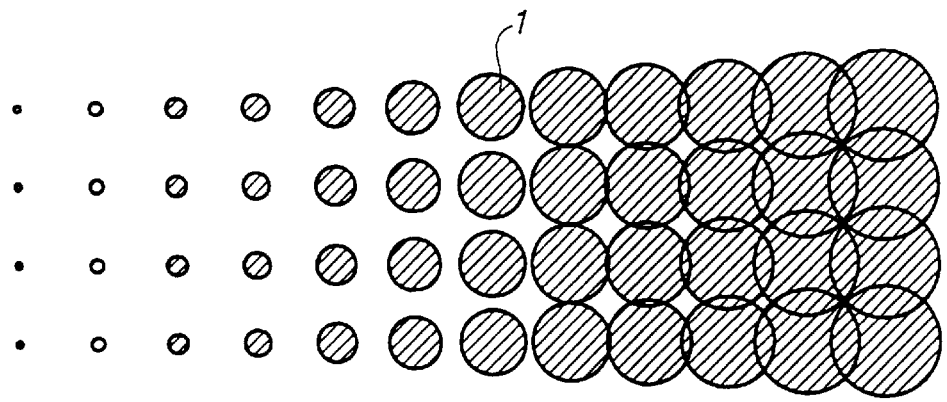
FIG. 5
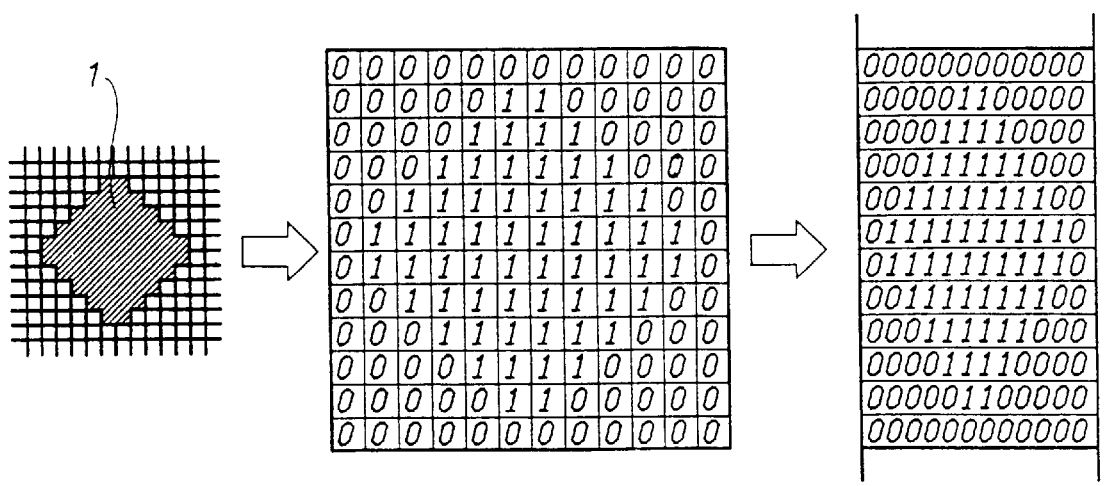
FIG. 8.1   FIG. 8.2   FIG. 8.3

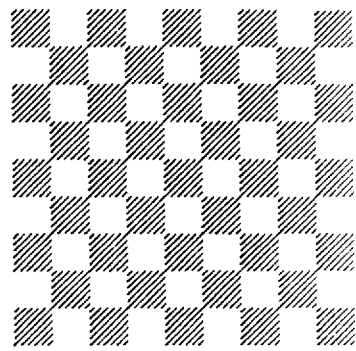
FIG. 9.1
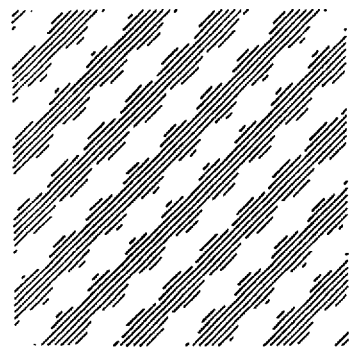
FIG. 9.2
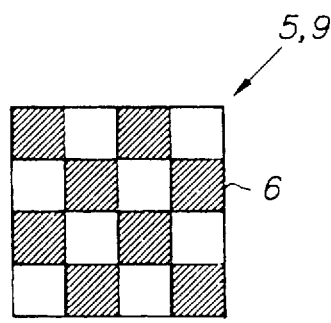
FIG. 10.1
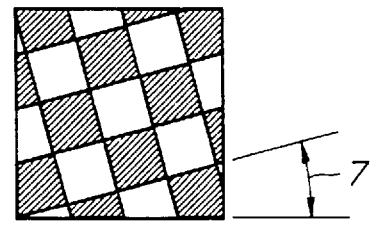
FIG. 10.2
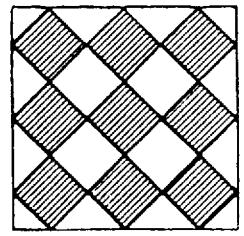
FIG. 10.3
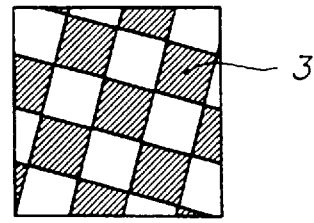
FIG. 10.4

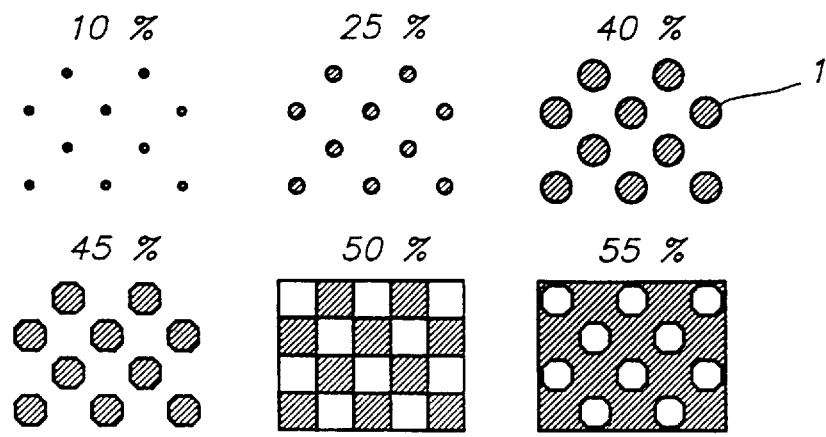
FIG. 12
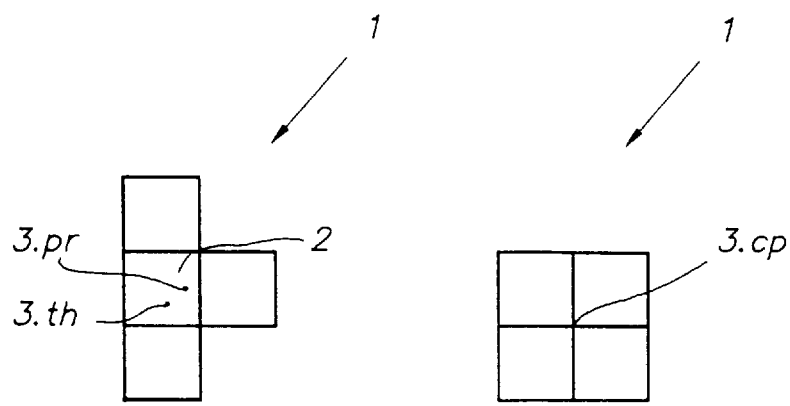
FIG. 14.1    FIG. 14.2

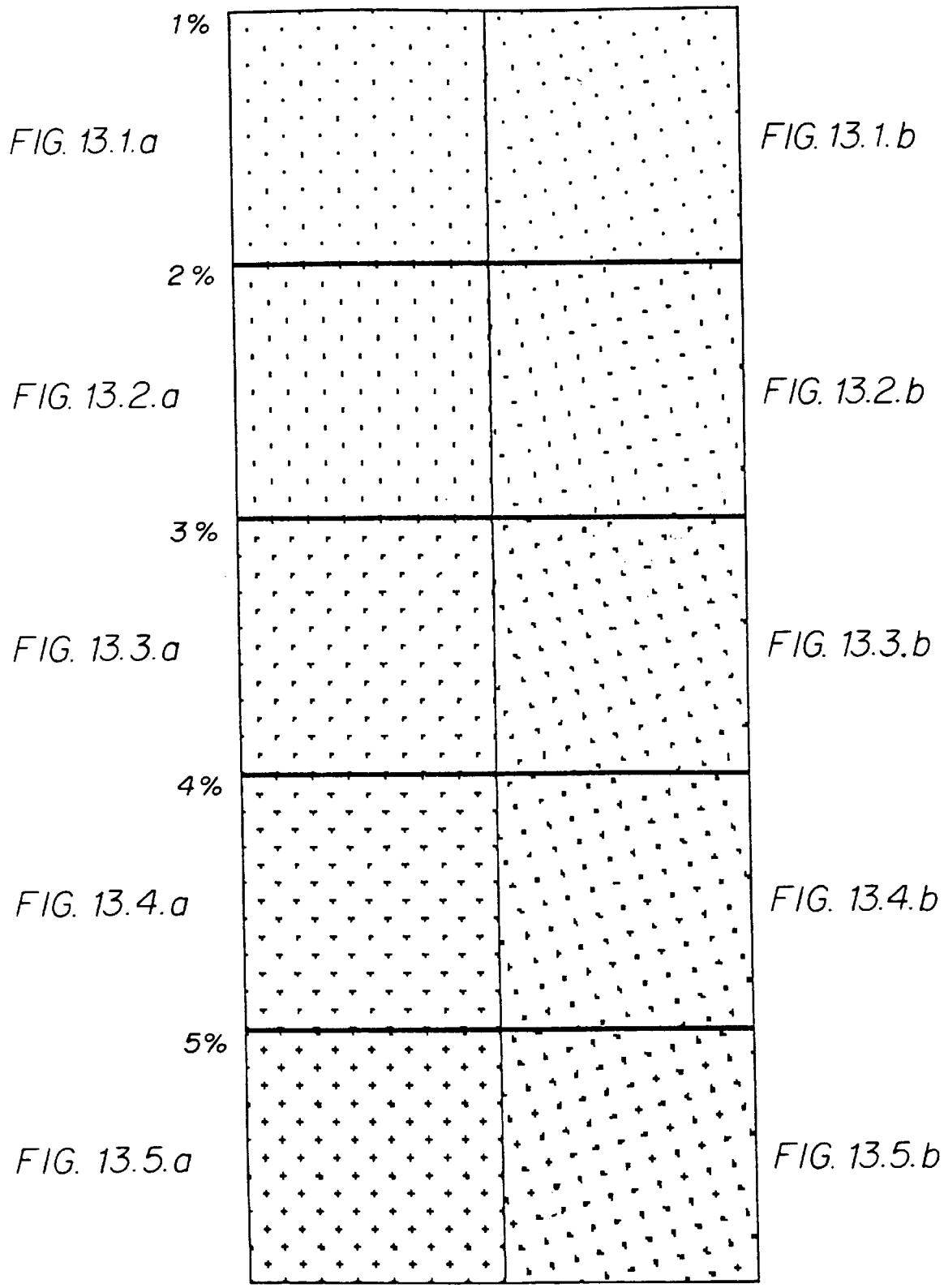

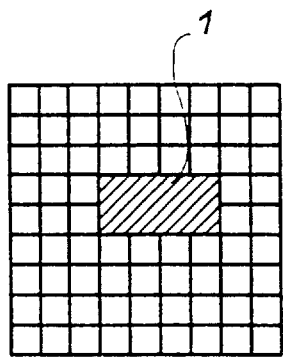
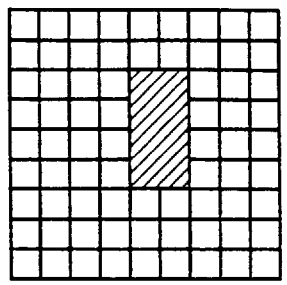
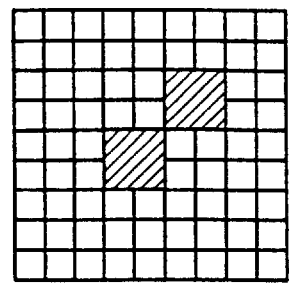
FIG. 15.1  FIG. 15.2  FIG. 15.3
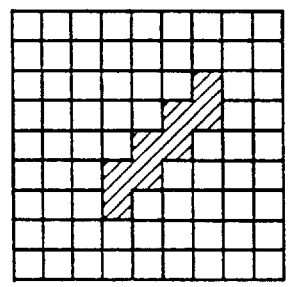
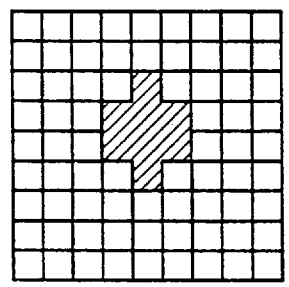
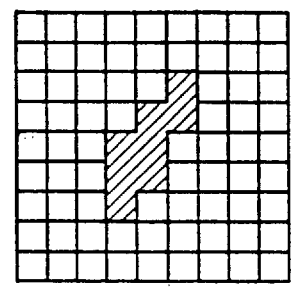
FIG. 15.4  FIG. 15.5  FIG. 15.6
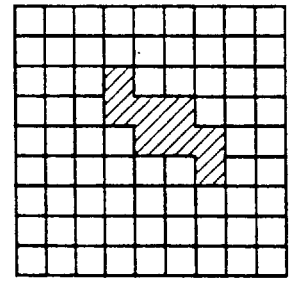
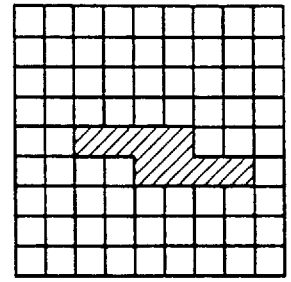
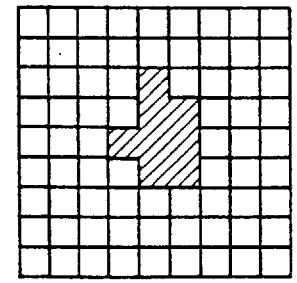
FIG. 15.7  FIG. 15.8  FIG. 15.9
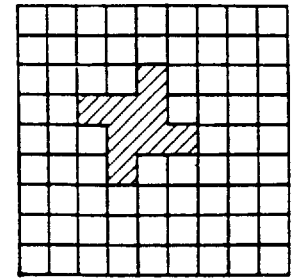
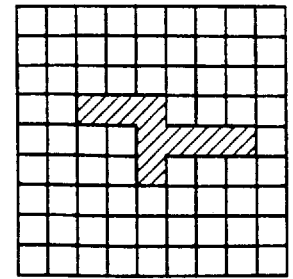
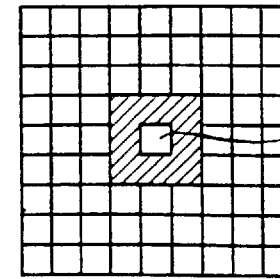
FIG. 15.10  FIG. 15.11  FIG. 15.12
FIG. 15

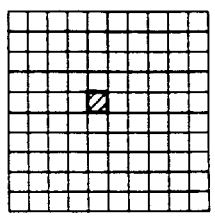
FIG. 20.1
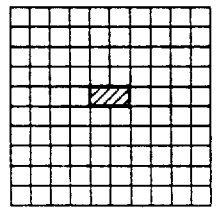 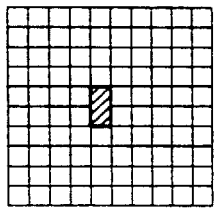 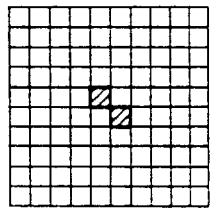
FIG. 20.2a  FIG. 20.2b  FIG. 202c
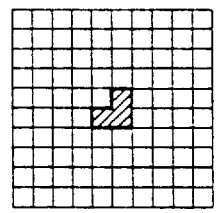 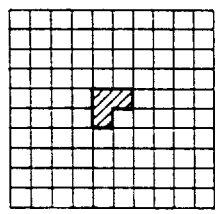 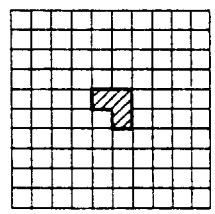 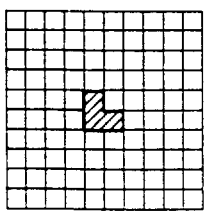
FIG. 20.3a  FIG. 20.3b  FIG. 20.3c  FIG. 20.3d
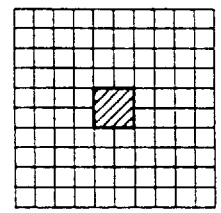 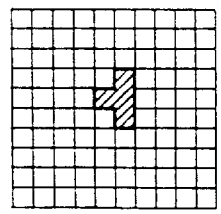 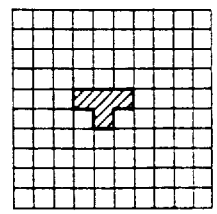 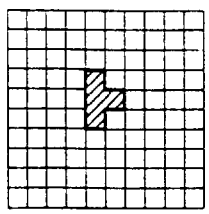 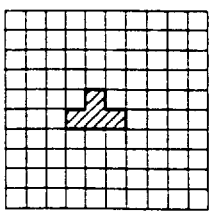
FIG. 20.4  FIG. 20.4a  FIG. 20.4b  FIG. 20.4c  FIG. 20.4d
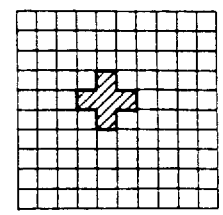 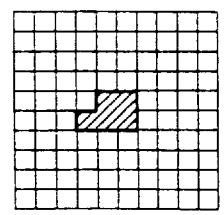 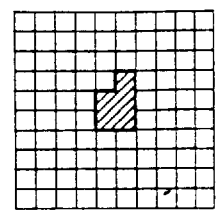
FIG. 20.5  FIG. 20.5a  FIG. 20.5b
← FAST SCAN
FIG. 20

AUTOTYPICAL SCREENING WITH OPTIMISED DOTSHAPE

FIELD OF THE INVENTION

The present invention relates to a method for generating a screened reproduction of a multiple-tone (contone) image by means of an electronic screening modulation of the original, and more particulary to a method for making a lithographic printing plate according to the silver salt diffusion transfer process.

BACKGROUND OF THE INVENTION

A number of reproduction methods are only capable of reproducing a small number of image tones. For example, offset printing or electrophotographic printing methods are only capable of printing two tone values i.e. deposit ink or toner or not. In order to reproduce images having continuous tones, a halftoning or screening technique is used.

A halftoning technique converts a density value into a geometric distribution of binary dots that can be printed. The eye is not capable of seeing the individual halftone dots, and only sees the corresponding "spatially integrated" density value.

For digital halftoning high resolution laser recorders are used to generate halftone dots on an imaging element, comprising a photographic film, paper or plate. The laser beam scans the film or plate on a line-by-line basis. Within every line the laser beam can be modulated "on" or "off" at discrete positions. In this way, an addressable "grid" is formed of lines and columns.

Two main classes of halftoning techniques have been described for use in the graphic arts field. These two techniques are known as "amplitude modulation screening or autotypical screening" (abbreviated as AM) and "frequency modulation screening or stochastic screening" (abbreviated as FM). Reference is made to FIGS. 1 and 2, wherein FIG. 1 illustrates an arrangement as used in amplitude modulation and comprising microdots 2 clustered together into a halftone dot 1; and wherein FIG. 2 illustrates an arrangement of microdots 2 as used in frequency modulation. For a clear understanding, most of the relevant technical terms used in the present application are explained in a separate chapter at the beginning of the detailed description (see later on).

According to amplitude modulation screening, the halftone dots, that together give the impression of a particular tone, are arranged on a fixed geometric grid. By varying the size of the halftone dots the different tones of an image can be simulated. Consequently this AM-technique can also be called "dot size modulation screening". FIG. 5 shows, by means of an example according to prior art, how increasing the size of halftone dots in a halftone pattern gives a denser image. FIG. 8.1 shows an exemplary AM-halftone dot, whereas FIG. 8.2 shows a bitmap configuration of said halftone dot, and whereas FIG. 8.3 shows a representation of said bitmap when saved in an electronic memory.

Said AM-halftone technique is often used in combination with a digital film recorder, which consists of a scanning laser beam exposing a photosensitive material at high resolution. The photosensitive material, generally called "imaging element", can be a photographic film, from which later on a printing plate is prepared by means of photomechanical techniques.

As the present invention relates more specifically to a method for preparing a lithographic printing plate, in particular to a method for preparing a lithographic printing plate comprising the steps of informationwise exposing an imaging element and thereafter processing the exposed imaging element by a diffusion transfer process, some additional background is given hereinafter.

Lithographic printing is the process of printing from specially prepared surfaces, some areas of which are capable of accepting ink (called "oleophilic" areas) whereas other areas will not accept ink (called "oleophobic" areas). The oleophilic areas form the printing areas while the oleophobic areas form the background areas.

Two basic types of lithographic printing plates are known. According to a first type, so-called "wet" printing plates, either water or an aqueous dampening liquid and ink are applied to the plate surface that includes hydrophilic and hydrophobic areas. The hydrophilic areas are soaked with water or the dampening liquid and are thereby rendered oleophobic while the hydrophobic areas will accept the ink. A second type of lithographic printing plate operates without the use of a dampening liquid and is called "driographic" printing plate. This type of printing plate comprises highly ink repellant areas and oleophilic areas.

Lithographic printing plates can be prepared using a photosensitive lithographic printing plate precursor, referred to herein as an "imaging element". Such an imaging element is exposed in accordance with the image data and is generally developed thereafter so that a differentiation results in ink accepting properties between the exposed and unexposed areas.

Silver salt diffusion transfer processes are known and have been described, for example, in U.S. Pat. No. 2,352,042 and in the book "Photographic Silver Halide Diffusion Processes" by Andre Rott and Edith Weyde—The Focal Press—London and New York (1972).

From the above it will be clear that lithographic printing is only capable of reproducing two tone values because the areas will either accept ink or not. Thus lithographic printing is a so-called "binary" process. As mentioned hereabove, in order to reproduce originals having continuously changing tone values by such processes, halftone screening techniques are applied. Yet the rendering of small dots still presents an important problem as is explained hereinafter.

Laser imagesetters and "direct to plate recorders or platesetters" expose halftone images on graphic arts film and plates by means of laser beam scanning and modulation. The faithful rendition of halftone levels, represented by binary bitmap images, is difficult to achieve because the image is distorted by the gaussian intensity distribution of the laser beam (FIG. 3 sketches a three-dimensional distribution of a Gaussian laser beam) and by the sensitometric characteristics of the film and plate material. This distortion changes the rendition of the halftone levels: small dots (positive or negative) in lowtones or highlights and small dots in hightones or shadows may be rendered too small (over- and underexposure) and halftone dots tend to print unevenly or not at all. Generally, a black dot in a white area is called "a highlight", whereas a white dot in a dark area is called "a shadow".

This distortion will thus be most noticeable in small dots, wherein not only the edges but also the density of the dot will not be rendered optimally. At the other end of the tone scale small unexposed areas, will become fogged by the influence of light beams exposing the surrounding area. This means that the faithful rendition of small dots or small holes can be extremely difficult.

As to a possible solution for this problem, some different approaches might be undertaken.

First, an overall compensation by applying a higher or lower laser power is not acceptable because overexposure makes the small highlight dots larger but fills up the small shadow dots. Underexposure reverses this effect, opening up the shadows but reducing the highlights. Both over- and underexposure will reduce the number of rendered halftone levels, and hence also the tonal range, considerably.

Second, theoretically, the best results can be obtained using a laser beam with an optimum spot size for each scan resolution in combination with a graphic arts film or plate characterized by a high gradient and steep toe. This requires imagesetters with tight manufacturing tolerances and films with special (so-called "explosive") development techniques and reduces the working latitude considerably.

Before describing a third approach in solving the aforementioned problems by means of a so-called euclidean dotshape, it may be remarked that theoretically a screen can be designed to produce virtually any shape of dots, but in practice generally square shapes and elliptic shapes are used. Reference can be made to FIG. 9.1 which shows a halftone screen comprising square dot shapes, and to FIG. 9.2 which shows a halftone screen comprising elliptical dot shapes.

As just initiated, a third approach in solving the aforementioned problems uses a so-called euclidean dotshape and is commercially applicated in filmrecorders of the Selectset and Accuset series of the company Miles Inc. Agfa division. This approach, called "Agfa Balanced Screening"—shortname "ABS", tradename ™—, is protected by e.g. EP 0 454 274 A2 (in the name of AGFA Corporation), describing a method for controlling halftone dot shape during dot growth. Herein the dot shape gradually changes during dot growth from 0% to 100%, for both standard quadratic screens (cfr. FIG. 9.1) and for elliptical screens (cfr. FIG. 9.2). More specifically the shape of the halftone dot during dot growth changes from circular at the origin of 0% to square at 50% and back to circular at 100%. Thus, the dots grow through a shape sequence of round at the beginning, through rounded square to square at 50%, and the back to rounded square to finally round again at 100%.

Yet, even in screening systems with an euclidean dotshape, some deficiencies in recording small halftone dots still remain perceptable: no consistent reproduction is possible in the extreme ranges of the tone scale (say from 0 to 3% or from 97 to 100%).

From the previous explanation follows that a need exists for a halftoning system that provides a consistent reproduction of the halftone dots across the full tone scale.

OBJECTS OF THE INVENTION

It is an object of the present invention to provide a method for generating a screened reproduction of a contone image with improved reproduction characteristics, also called gradation characteristics, especially in the highlight and shadow tones of an image.

It is also an object of the present invention to provide a method for making a lithographic printing plate from a printing plate precursor by means of amplitude modulation screening an original with improved printing properties, an extended tone scale in print, and an extended usable lifetime of said printing plate.

Further objects and advantages of the invention will become apparent from the description hereinafter.

SUMMARY OF THE INVENTION

According to the present invention there is provided a method for for generating a screened reproduction of a multiple tone image comprising the steps of autotypical screening (or amplitude modulation) said multiple image to obtain screened data representing tones of said multiple tone image in terms of halftone dots; reproducing said halftone dots on an imaging element by means of a scanwise exposure, wherein in extreme regions of the tone scale the shape of said halftone dots is compact by having a ratio of peripheral length to surface area which is minimal.

According to the present invention there is also provided a method for making a lithographic printing plate from a lithographic printing plate precursor having a surface capable of being differentiated in ink accepting and ink repellant areas upon scanwise exposure and an optional development step.

BRIEF DESCRIPTION OF THE DRAWINGS

FIG. 4.1 to 4.2 represent enlarged views of comparative autotypical screenings at 1200 dpi-120 lpi, under 45° and 15°, carried out according to prior art ABS (FIG. 4.1) and according to the present invention (FIG. 4.2);

FIG. 5 shows in a prior art example, how increasing the size of halftone dots gives a denser image;

FIG. 8.1 shows a prior art exemplare of an AM-halftone dot;

FIG. 8.2 shows a bitmap configuration of said halftone dot;

FIG. 8.3 shows a representation of said bitmap when saved in an electronic memory;

FIG. 9.1 is a halftone screen comprising square dot shapes;

FIG. 9.2 is a halftone screen comprising elliptical dot shapes;

FIG. 10.1 to 10.4 show screen patterns, respectively under screen angles of 0°, 15°, 45° and 75°;

FIG. 12 shows examples of dots at various densities

FIGS. 13.1.*a* to 13.5.*b* represent enlarged views of ABS-autotypical screening at 1200 dpi-120 lpi, under 45° and 15°;

FIG. 14.1 shows a halftone dot indicating a theoretical dotcenter 3th and an actual dotcenter 3pr according to prior art;

FIG. 14.2 shows a halftone dot indicating a shifted dotcenter 3 cp after the halftone dot has been made compact according to the present invention;

FIG. 15 comprises FIGS. 15.1 to 15.12 and shows twelve experimental shapes of halftone dots, used in comparative experiments according to the present invention and carried out on film;

FIG. 20 shows sixteen experimental shapes of halftone dots, used in comparative experiments according to the present invention and carried out on lithographic printing plates;

DETAILED DESCRIPTION OF THE INVENTION

Figure 1:
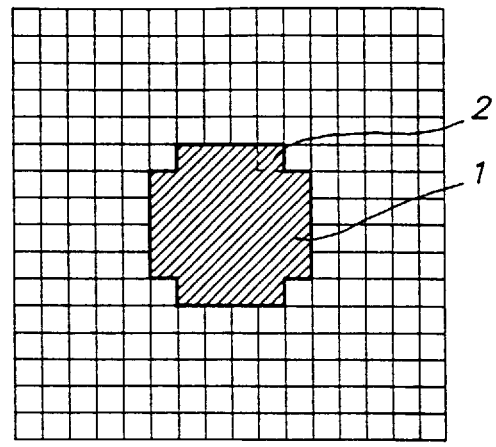
FIG. 1 illustrates an exemplary arrangement of microdots as used in amplitude modulation.
Figure 2:
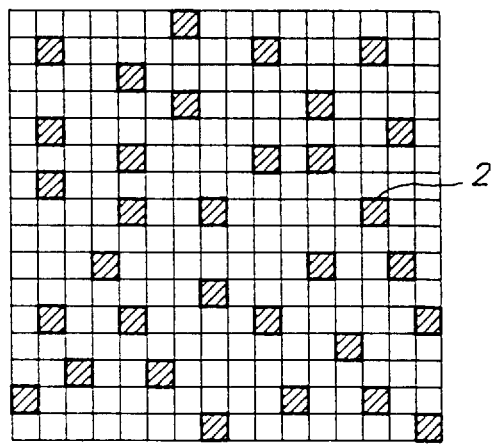
FIG. 2 illustrates an exemplary arrangement of microdots as used in frequency modulation screening.
Figure 3:
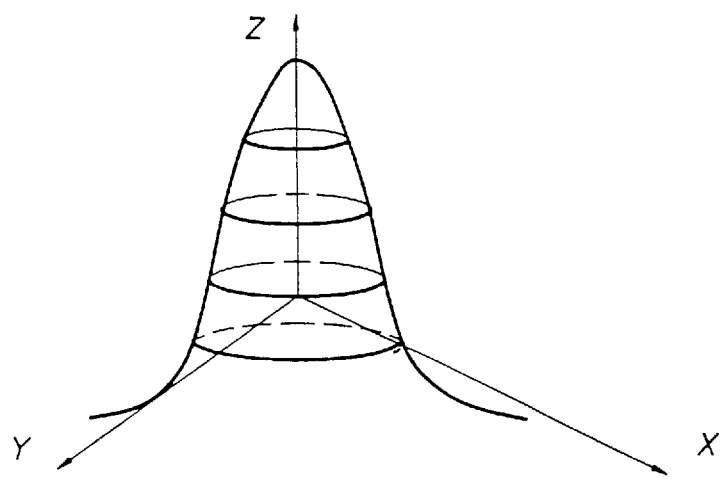
FIG. 3 is a three-dimensional distribution of a Gaussian laser beam.

The description given hereinbelow mainly comprises five chapters, namely (i) terms and definitions used in the present application, (ii) preferred embodiments of autotypical screening with optimised dotshape, (iii) preferred embodiments (apparatus) for implementing an autotypical screening with optimised dotshape, (iv) preferred embodiments for making a lithographic printing plate, and (v) further applications of the present invention.

(i) Explanation of terms and definitions used in the present description

As an aid to understanding the discussion to follow, the meaning of some specific terms applying to the specification and to the claims are explained.

An "original" is any (hardcopy or softcopy) representation containing information representative for density values (e.g. density, transmission, opacity) of an image. The term original also includes a so-called "synthetic image", e.g. composed by a computer program.

Each original is composed of a number of picture elements, shortly called "pixels". The number of pixels depends on the spatial resolutions in mainscan or fastscan direction X and in subscan or slowscan direction Y.

A "contone (or continuous tone) image" or a "multiple tone image" is a representation by digital data, either explicit (previously generated) or implicit (generated on the fly) of a contone original. A contone image comprises a matrix of elements; each element can take C different values of contone levels, wherein the number C of possible values must be greater than two (C>2; e.g. C=256).

A "halftone image" is a representation by digital data of a contone original. A halftone image comprises a matrix of elements, wherein the number of possible values H of said elements is lower than the corresponding number of contone levels C (so H<C).

A tone value (or tone level) on a tone scale (or grey scale) relates to a degree or percentage of occupance or "coverage", sometimes also called "percentage value" (e.g. a coverage of 50%).

By the wording "imaging element" is mainly ment any photosensitve material, thus comprising at least a photosensitive layer. Non-limitative examples of imaging elements are silver salt diffusion transfer materials, materials containing diazonium salts or a diazo resin, materials containing a photopolymerizable composition and heat mode recording materials wherein the heat pattern is caused by a light source. Herein, the art of the substratum is not of particular relevance and may comprise e.g. film, paper, polyester, aluminium, etc. For example, the imaging element can be a photographic film from which later on a printing plate is prepared by means of photomechanical techniques.

A "positive-working imaging element" is an imaging element which operates in a positive imaging system (to be defined in the next paragraph), and hence, causes an increase of a density on an imaging element as a decrease of exposure intensity occurs (e.g. black areas on an original have to be not-illuminated in order to render a corresponding area on a imaging element also black; at least, after an optional development).

A "positive imaging system" is an imaging system wherein the image on an imaging element is formed by non-exposed areas.

A "micro dot" or "elementary dot" or "recorder element" (generally abbreviated as "rel")—indicated by referral 2 in FIGS. 1, 2, 11 and 15—is the smallest spatially addressable unit on a recording device. A rel can have any form, such as rectangular or hexagonal, or circular, or square.

In connection with imaging elements which were subjected to a process comprising an autotypical modulation screening of an original, an autotypical modulated "halftone dot" (or shortly "dot")—indicated by referral 1 in FIGS. 1, 5, 8, 11, 12 14 and 15—is an image unit that is rendered on said imaging element after exposing and processing said material and comprising a contiguous cluster of microdots. The size of a halftone dot can be equal to the size of a single rel or may comprise several (clustered) rels. A halftone dot can have any form (cfr. FIG. 15, to be discussed later on), but usually its shape is square or rectangular or euclidean.

A "recorder grid" (or shortly "grid") comprises a periodical structure of lines (or rows) and columns which are addressable and defines the resolution at which the laser beam can be modulated ON or OFF.

A "screen" (indicated by referral 5 in FIGS. 10.1 and 15.6) is a two-dimensional periodical structure that is virtually applied to an imaging element and thus a screen can be interpreted as comprising an "empty" grid filled with halftone dots. Most screens are formed by adjacent identical rectangles, called screen cells 6. Screens can be aligned on horizontal axes or screens can be applied to the imaging element under a specific raster angle 7 (cfr. FIGS. 10.1 to 10.4).

A halftone dot has a "dot center" (indicated by referral 3 in FIGS. 10.1, 14.1 and 14.2), which is the center of the spot on the imaging element caused by the rendering system.

A "dot pattern" is defined by an "angle" (measured along the direction of the shortest line that connects two dot centers, a "screen ruling" (defined by the number of dot centers per measurement unit, measured in the direction of the screen angle), and the shape of the dots as they grow from small (e.g. 0%) to large (e.g. 100%) (usually controlled by a so-called "spot function").

(ii) Preferred embodiments of autotypical screening with optimised dotshape

Acccording to a preferred embodiment of the present invention, a method for generating a screened reproduction of a multiple tone image comprises the steps of autotypical screening (or amplitude modulation) said multiple image to obtain screened data representing tones of said multiple tone image in terms of halftone dots; reproducing said halftone dots on an imaging element by means of a scanwise exposure, wherein, especially in extreme regions of the tone scale, the perimeter of the halftone dots is not too lengthy, but instead preferably short, such that the shape of said halftone dots is said to be "compact".

In order to be as clear as possible, the just formulated solution will be explained in some different steps. First, as a general starting point relating to shape and growth of dots in function of varying coverages, reference may be given to FIG. 12, which shows prior art examples of dots at various densities (e.g. from 10% to 55%). Remark that a checkered pattern or "checkerboard" 9 may appear at a density of 50%. In a second instance, a closer look may be taken at a more practical shape and growth of dots (namely ABS™) in function of varying coverages in extreme zones of the tone scale, comprising either highlights or shadows. Hereto, reference is made to FIG. 13, comprising FIGS. 13.1.a to 13.5.b, which represent results (for sake of greater perceptibility magnified by a factor of nearly 22×) of autotypical screening at an addressability (or recorder resolution) of 1200 dpi, a ruling (or lineature) of 120 lpi and raster angles of 45° (cfr. left side figures, with appendix a) and of 15° ((cfr. right side figures, with appendix b). As indicated in the drawings by appropriate labels, FIGS. 13.1 (both a and b) represent results at a coverage of 1%, FIGS. 13.2 (both a and b) represent results at a coverage of 2%, up to FIGS. 13.5 (both a and b) which represent results at a coverage of 5%.

From this FIG. 13 many experimental facts may be very clear, amongst others: that (even in nearest prior art, as ABS) dot shape is not constant over the tone scale, even not over minor changes in the tone scale (as e.g. from 1% to 2%, or 2% to 3%, etc), even not at a same coverage but under different angles (as e.g. at 1% under 45° or under 15°, etc), even not at a same coverage and under a same angle (as e.g. at 1% under 45°, or at 5% under 15°, etc)! It also may be seen very definetely that in the prior art the area-to-perimeter ratio of printed dots is not a constant.

For the people skilled in the art, it may be self speaking that the just mentioned differences in dot shape are less pronounced if a higher addressability would be used; but nevertheless, they still remain inherently present. Comparative experiments were undertaken by the inventor, but the resulting graphs are omitted from the present description in order to reduce the volume of the text and also in order not to confuse the reader.

In a third instance, the inventors have carried out many comparative experiments on several experimental shapes of halftone dots (which are illustrated in FIGS. 15.1 to 15.12). In the further description of dedicated experiments, attention will be drawn mainly to the dot shapes illustrated in FIGS. 15.1, 15.2, 15.4, 15.5, 15.8, 15.9, 15.10. The results of experiment on dot shapes illustrated in FIGS. 15.3, 15.6, 15.7, 15.11 and 15.12 are available at the inventor's laboratory, but are omitted from the present description in order to reduce the volume of the text and also in order not to confuse the reader.

Figure 16:
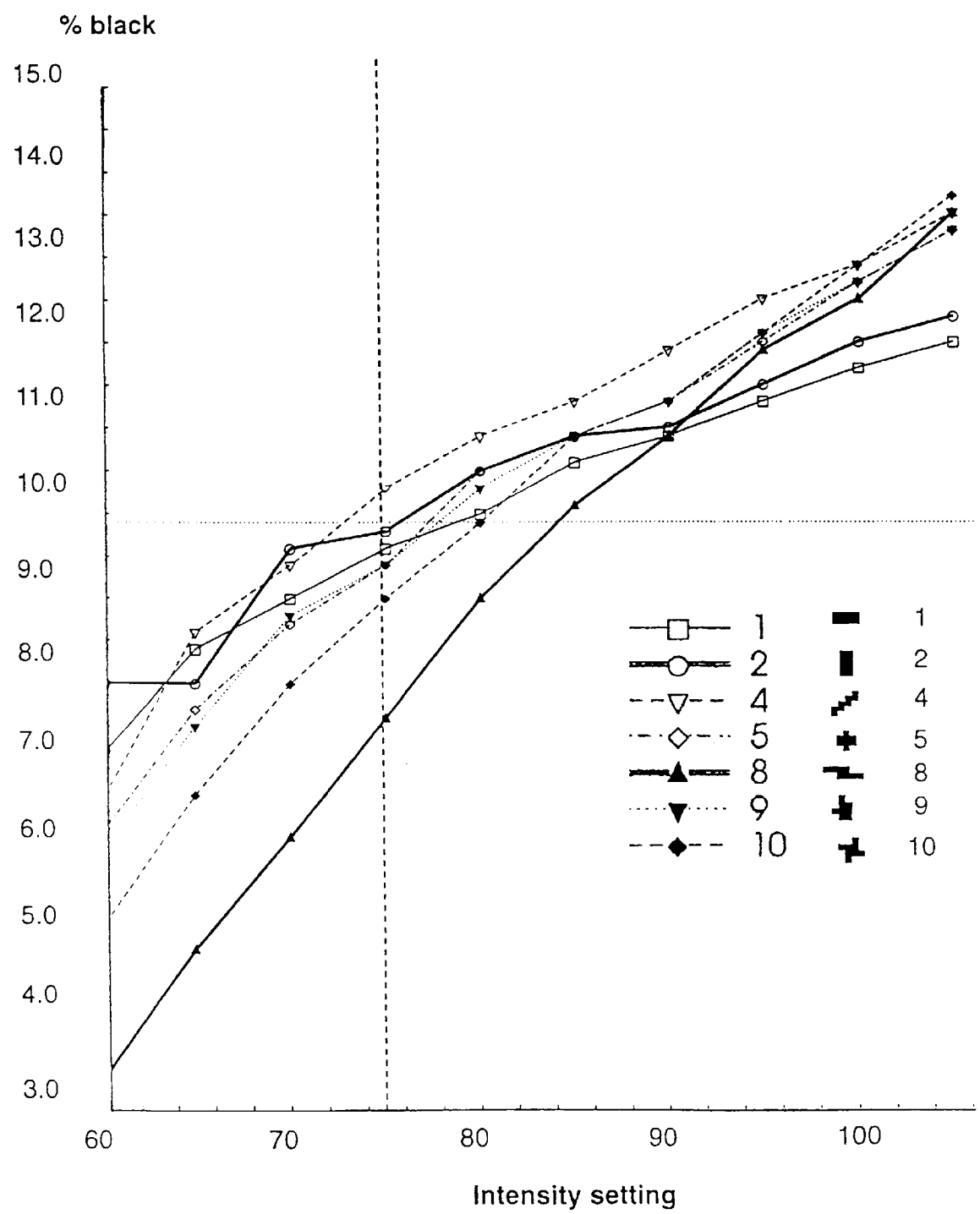
FIG. 16 shows comparative experiments on film, of seven different shapes of halftone dots used under different intensity settings, intended for a linear output of 9.9%, according to the present invention.
Figure 17:
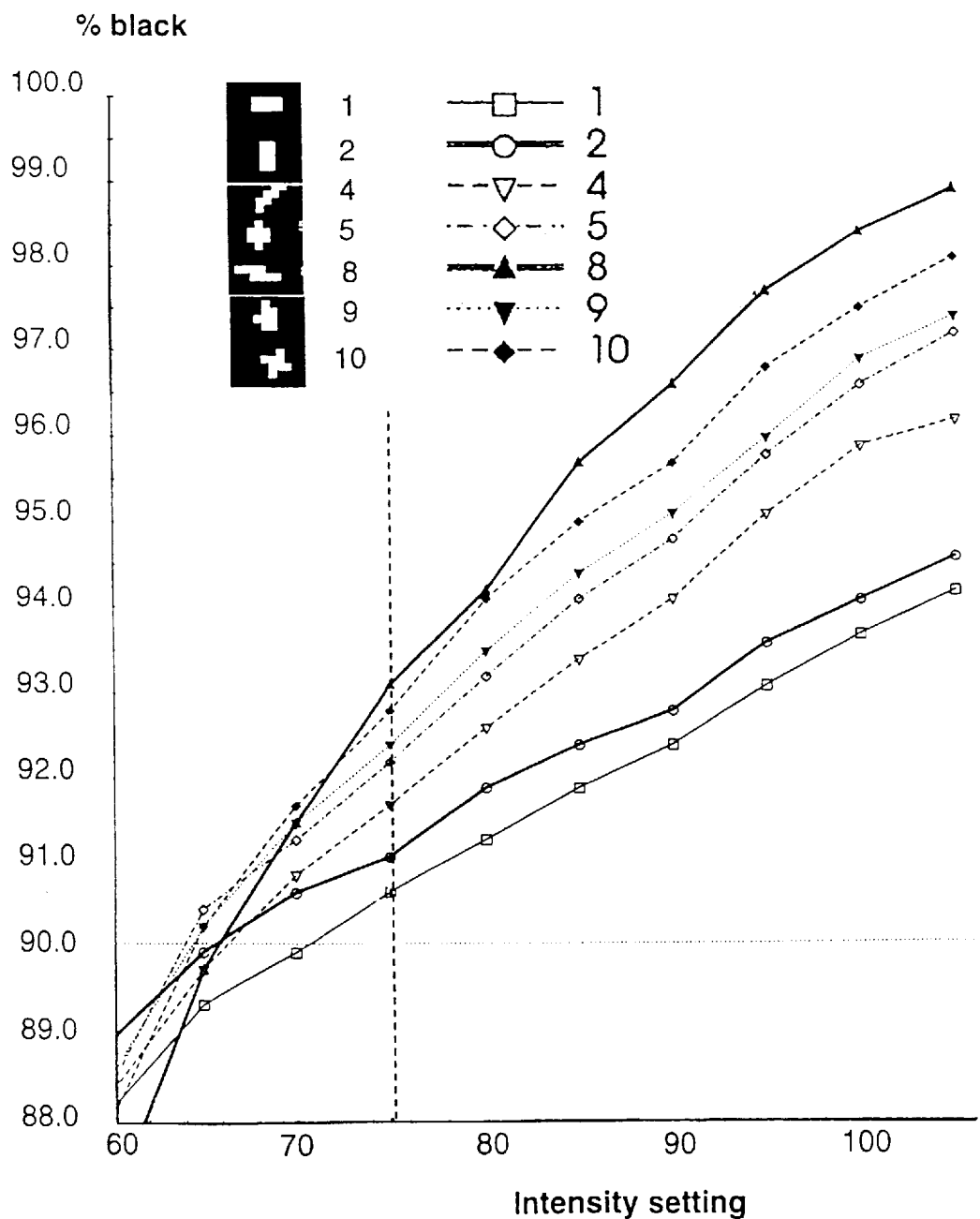
FIG. 17 shows comparative experiments on film, of seven different shapes of halftone dots used under different intensity settings, intended for a linear output of 90.1% according to the present invention.

In a further instance, the dot shapes of FIG. 15 are effectively used in comparative experiments, the results of which are discussed in reference to FIGS. 16 and 17.

In FIG. 16 an experiment with 7 different dot shapes (namely the same as indicated in FIGS. 15.1, 15.2, 15.4, 15.5, 15.8, 15.9, 15.10), but with a common linear output of 9.9% (resulting from 8 effectively recorded microdots on an array comprising 9×9 possible microdots) was carried out on filmaterial SFP 812p (commercially available from AGFA-GEVAERT), at a high resolution (in order to be very distinctive) of 3600 dpi.

On the abscis several intensity settings of the imagesetter are indicated (ranging from 60 to 106; relative values). On the ordinate the % black (measured with a densitometer Macbeth TR 924) and recalculated by the so-called formula of Murray-Davies) on processed films are indicated (ranging from 3.0 to 15.0%). By the so-called formula of Murray-Davies (cfr. "Monochrome Reproduction in Photoengraving", J. Franklin Institute, June 1936, vol. 221, pp. 721–744) is ment:

$$\% \text{ black} = \frac{1 - 10 \exp[-(Dt - Db)]}{1 - 10 \exp[-(Ds - Db)]} \cdot 100 \text{ [in \%]}$$

wherein
% black represents the percentual area of a halftone dot;
Dt=measured density of a tint;
Ds=measured density of a solid;
Db=measured density measured on a base material (including substratum and optional fog if present).

From said graph many facts may be concluded; amongst others that the endresult of coverage expressed in "% black" is highly influenced by the intensity setting of the imagesetter and thereabove, that this influence is highly dependent from the applied dot shape. Putting the experimental results in more practical terms, it may be concluded that in the lower coverage range of the tone scale, that the dot shapes 15.1 and 15.2 are the less dependent ones (by having the broadest latitude in exposure) and thereabove, they are the most correct (meaning that the wanted output of 9.9% is approached by a very near % black on the printed material, here between 9.8 and 9.6%). It also may stated that in dot shapes 15.1 and 15.2 the perimeter of the halftone dots is not too lengthy, but instead preferably short, such that the shape of said halftone dots is said to be "compact", meaning that they have a ratio of peripheral or circumferential length to surface area which is minimal (although this ratio does not have to be perfectly constant).

For a clear understanding, attention may be drawn to another remarkable result, namely the fact that even within "equal compact" dot shapes (as e.g. 15.1 and 15.2 are), a dot shape which is "compact in the fast scan" direction (in these experiments, the scan-wise exposure was carried out using a laser in "horizontal" direction) gives even better results (e.g. dot shape 15.2 is preferred above dot shape 15.1).

The results of analogue comparative experiments on the highest region of the tone scale are illustrated in FIG. 17. Herein, the linear output is ment to reach 90.1% (resulting from 8 non-recorded microdots on a total of 9×9 possibly recordable microdots). The former results of FIG. 16 appear to be sustained in a similar way by the present FIG. 17.

As mentioned before, the present concept has been developed in order to minimize the loss of tonal range in the dark tints due to dot gain and light tints due to dot loss. In a further preferred embodiment of the present invention, said extreme regions of the tone scale comprise highlight tones lower than 15% coverage and/or shadow tones higher than 85% coverage.

In relation to FIGS. 16 and 17, in a further preferred embodiment of the present invention, the shape of said halftone dots is square or rectangular.

In an alternative preferred embodiment of the present invention, the shape of said halftone dots is circular or elliptic (preferably in the fast scan direction). Of course, an elliptic shape only can be carried out if the halftone dots comprises enough microdots; for example, if a halftone dot only comprises four microdots, an elliptic shape is hard to attain (whereas a square shape is easily attained).

Figure 18:
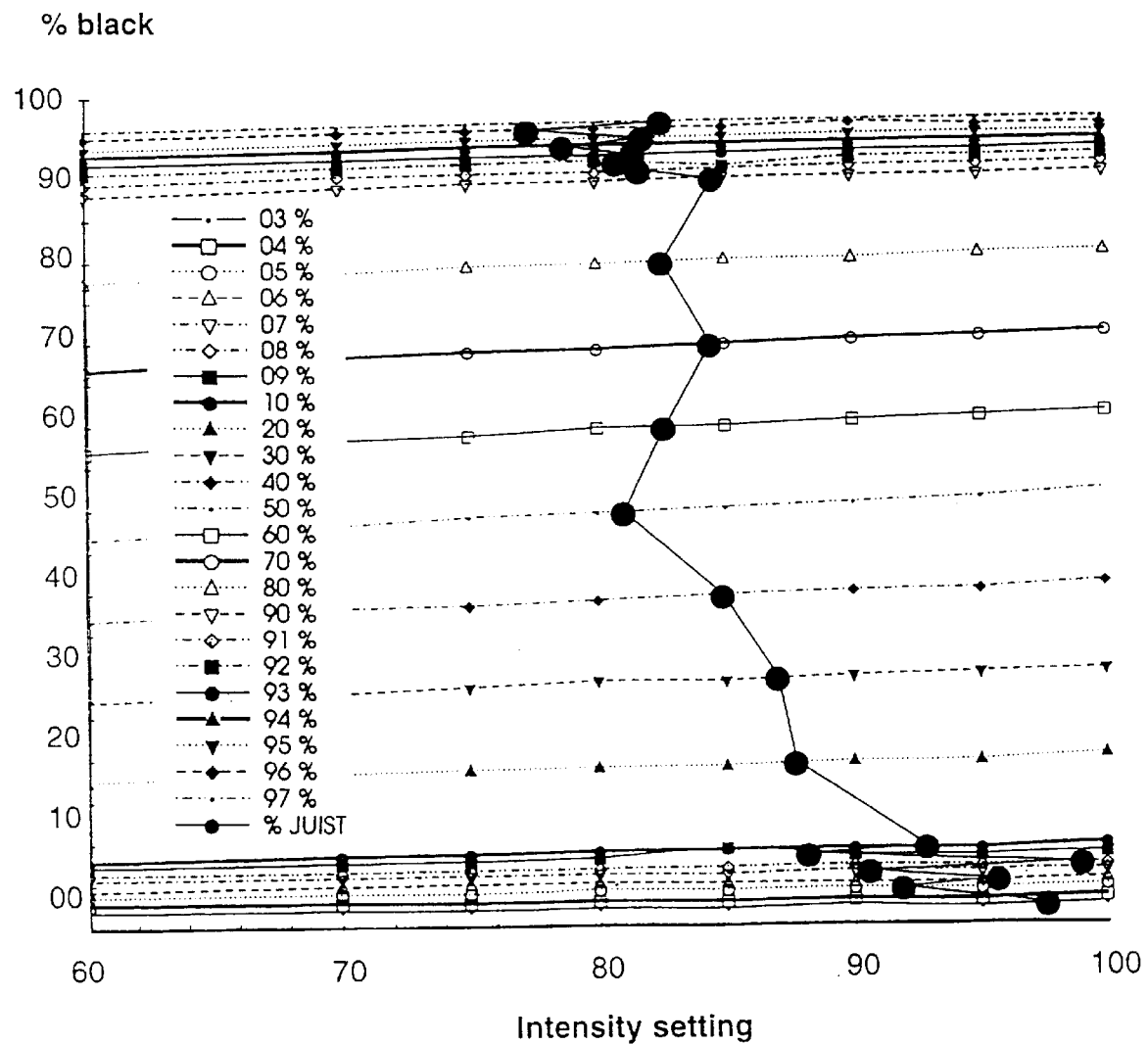
FIG. 18 shows comparative experiments on film, under different intensity settings, carried out over a whole tone scale according to an ABS-screening.
Figure 19:
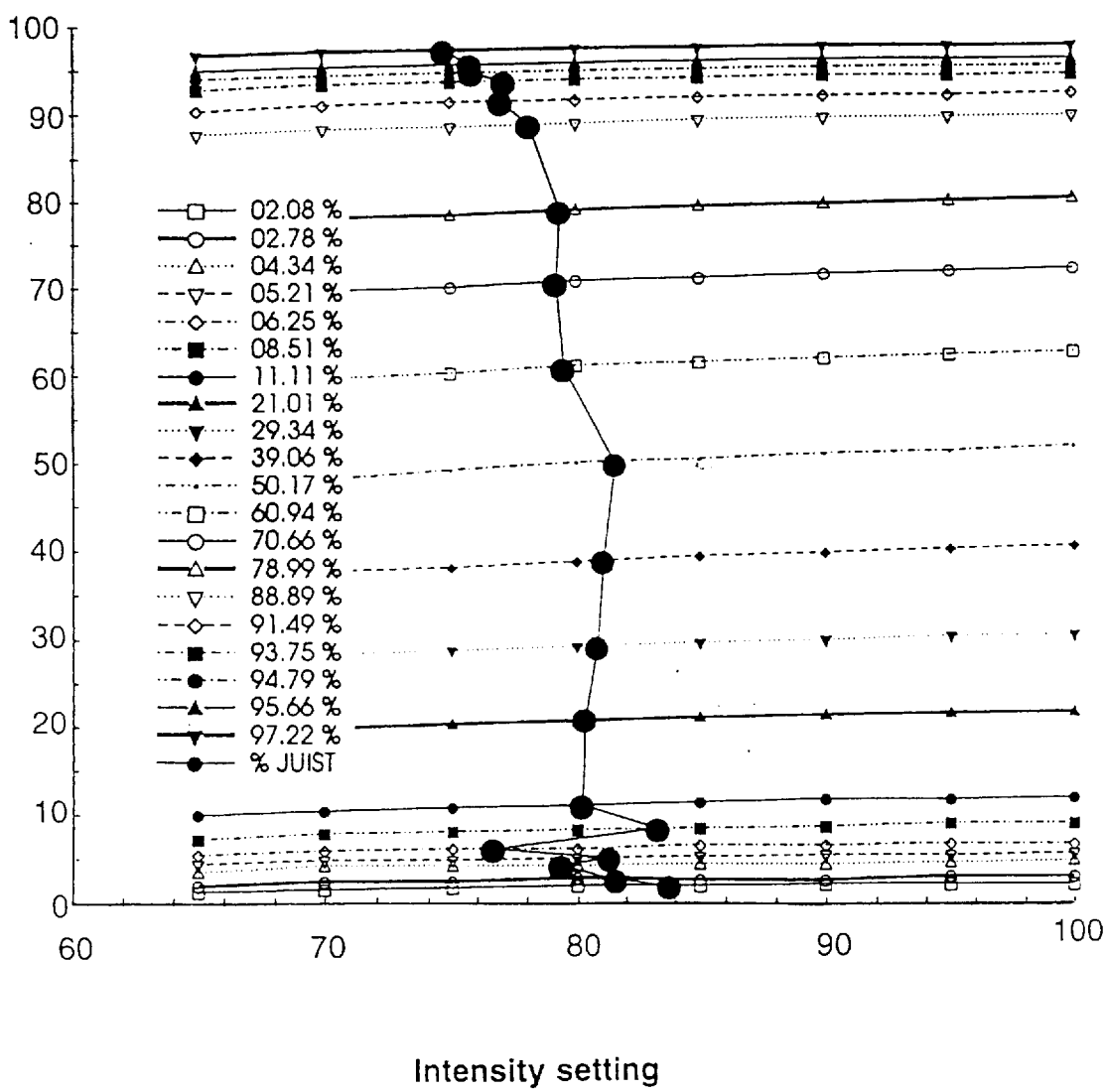
FIG. 19 shows comparative experiments (on intermediate film) under different intensity settings, carried out over a whole tone scale and using only rectangular dot shapes, according to the present invention.

In another preferred embodiment of the present invention, the shape of said halftone dots is uniform over the whole tone scale; which will be sustained by comparative experiments the results whereof are given in the graphs of FIGS. 18 and 19.

Common to FIGS. 18 and 19 are following experimental conditions: on a well calibrated imagesetter Selectset Avantra, He Ne Red LD Films SFP 812 G were exposed at 3600 dpi and 150 lpi by autotypical screening ABS (version 10.2) and processed according to OLPE G101C; the abscis gives intensity settings (in arbitrary units), the ordinate gives "% black" measured with a 0.01 D—precision-densitometer Macbeth type TRb 924 and recalculated by the so-called Murray-Davies equation. In both FIGS. 18 and 19, a "correct interconnection line" 95 is drawn which connects points on the graphs which are "correct", meaning that at those points a wanted "point %" (as programmed on a computer for the exposure) coincides with an effective "% black" (as measured on an exposed film).

In the experiments of FIG. 18 a ABS-screening was used, whereas in experiments of FIG. 19 only rectangular dot shapes were used. FIG. 18 indicates that the correct interconnection line 95 is not straight, nor (strictly) vertical; not in the midtones, and even less in the extremes of the tone scale. These experiments thus clearly illustrate the main problem of the prior art relevant to the present invention. Now, FIG. 19 indicates that the correct interconnection line 95 is much more straight, and much more vertical; eve in the extremes of the tone scale. If, in screening and printing practice, one would accept a small working tolerance of +−0.5 Log H, the correct interconnection line fits very well the criteria of being straight and vertical.

These experiments thus clearly illustrate a solution to the main problem of the prior art relevant to the present invention.

In a still further preferred embodiment of the present invention, in extreme zones of the tone scale, the centers of said halftone dots are varied slightly in order to preferably get a good shape of halftone dots, rather than an exact position of the center of halftone dots. In this case, in highlight zones and in shadow-zones some intentional phase adjustment is introduced, meaning that a certain inconsistency is created between the theoretical and actual dot centers, which can be viewed as a "local phase distortion" of the created versus the theoretical halftone dot screen. FIG. 14 illustrates how centers of gravity of two halftone dots can differ even if each halftone dot comprises exactly the same number of micro dots, e.g. four micro dots. FIG. 14.1 shows a halftone dot indicating a theoretical dotcenter 3th (based on geometric design of the screen grid) an an actual dotcenter 3pr (based on a so-called spot function) according to prior art. FIG. 14.2 shows a halftone dot indicating a shifted dotcenter 3cp after the halftone dot has been made compact according to the present invention; more particulary, after the halftone dot has been made square.

Figure 6:
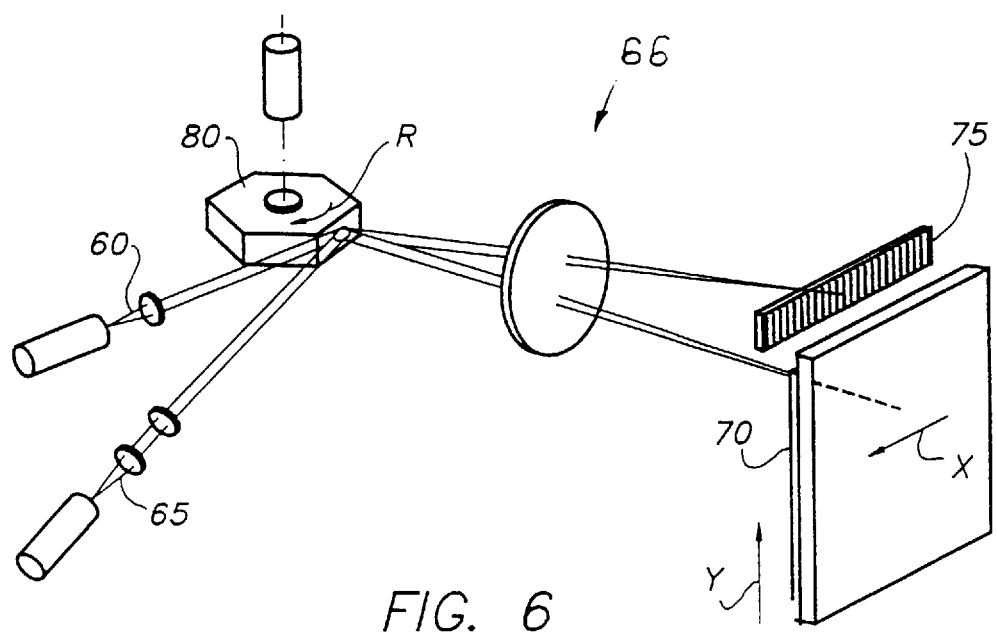
FIG. 6 shows a flat bed type scanning device for use in a method according to the present invention.
Figure 7:
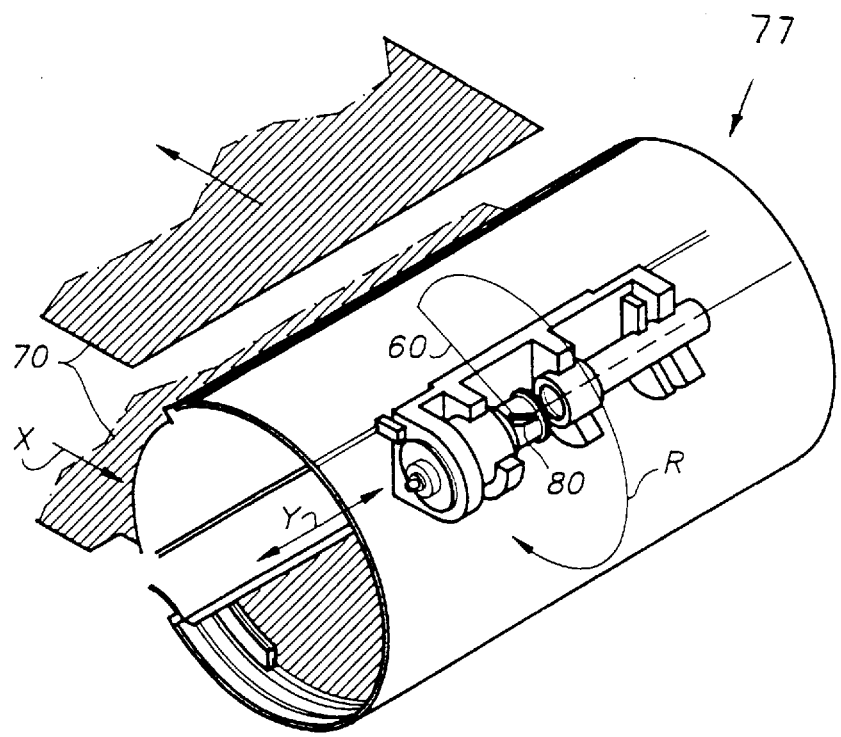
FIG. 7 shows an internal drum type scanning device for use in a method according to the present invention.

(iii) Preferred embodiments (apparatus) for implementing an autotypical screening with optimised dotshape In order to explain more deeply the modulation of the scanwise exposure of an imaging element according to the present invention, attention is given now to the exposure system itself. FIG. 6 schematically shows a flat bed type scanning device for use in a method according to the present invention; whereas FIG. 7 schematically shows an internal drum type scanning device for use in a method according to the present invention.

The exposing step comprises generating a modulated writing light beam 60 having a wavelength to which an imaging element 70 is sensitive and directing a writing light beam 60 to a moving mirror 80 to cause the writing light beam 60 to scan across the surface of the imaging element 70 in a first scanning direction X. A reference light beam 65 is generated and directed to the moving mirror 80 simultaneously with the writing light beam 60 to cause the reference light beam 65 to scan across the surface of a light detecting element 75 in the first scanning direction X. Since the writing light beam 60 and the reference beam 65 are both deflected by the same moving mirror 80, the reference beam 65 falling on the light detecting element 75 causes the generation of synchronising signals indicative of the position of the writing light beam 60 on the surface of the imaging element 70. The writing light beam 60 is modulated and the imaging element 70 is moved in a second scanning direction Y in response to the synchronising signals generated by the light detecting element 75. In this manner any imperfections in the surface of the moving mirror 80, or in its movement, are accounted for.

The writing light beam 60 is modulated as the scanning process proceeds, in order to informationwise expose the imaging element 70. The reference light beam 65 is not modulated, but is of constant intensity.

In a drum type scanning device (either internal drum, external or revolving drum) said reference beam is usually replaced by an encoding-and-decoding system. For sake of simplicity, in FIG. 7 no encoder has been illustrated.

If an image is scanned by a scanning device as illustrated in FIG. 6 or FIG. 7, the image information is converted into tone or grey values, normally between 0 (e.g. solid-tone) and 255 (e.g. white). For the resulting halftone imaging element 70, however, there are only two possible states: the image area is either black (i.e. printing) or white (i.e. non-printing). The continuous-tone signal produced by the scanner (between 0 and 255) must therefore be transformed into a binary value (1 or 0). The simplest possibility is to code all grey values above a certain threshold value with 1 and the remainder with 0. It is obvious that, in this way, a part of the image information may be lost.

Figure 11:
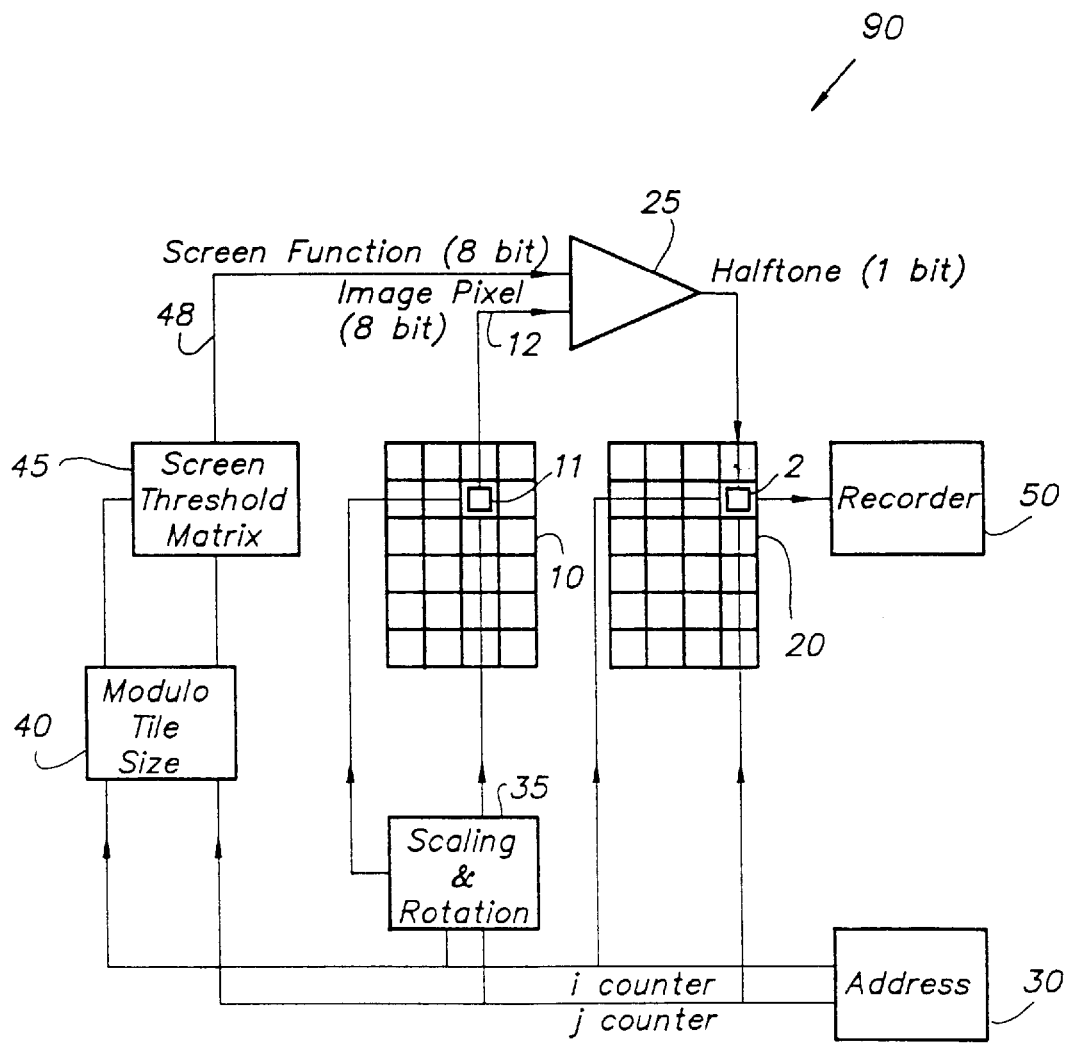
FIG. 11 is circuit for implementing a halftoning method suitable for use in the present invention.

Now, attention is given to FIG. 11, which shows a so-called "halftone generator", comprising a circuit to perform an autotypical screening in combination with a binary recording device, (e.g. an imagesetter) and implementing a halftoning method suitable for use in the present invention. First some basic information is given about different building blocks of this circuit, whereafter its operation will be explained.

This halftone image generator 90 is based on comparing at every position of the recorder grid the pixel value with a screen threshold value. Depending on the outcome, the recorder element or microdot is turned "on" or "off".

Block 10 (sometimes called "contone image" or "pixelmap") is a memory block containing the contone dot values of an image. Typically these are 8 bit values, organized as N lines with M columns. Each contone or multiple tone image pixel is carrying information about an address and an image signal. Block 20 (generally called "halftone image" or "bitmap") is a memory block with a same lay-out as block 10, in which halftoned pixel values will be stored. In the case of a binary recording device, every halftoned pixel word has a length of 1 bit. Block 50 is a device capable of imagewise exposing a substrate e.g. a photographic film or a lithographic printing plate precursor using the information in block 20. The conversion of a contone pixel value into a halftoned pixel value takes place in block 25 and may be based on a thresholding operation.

More in detail, the apparatus according to FIG. 11 operates in the following way. A recorder address counter 30 generates all possible combinations or addresses (i,j) to cover the area occupied by the halftone image 20 which may be stored partly or wholly within a halftone store (or bitmap). A contone image 10 may be stored in an image store (or pixelmap), but possibly with an orientation and scale different from the required scale and orientation of the halftone image 20 at the recorder grid 4. Therefore, the i-counter and j-counter from the recorder address counter 30 needs to undergo a scaling and rotation transformation in a scaling and rotation unit 35. The input of this unit 35 are the i-counter and j-counter values, the output is an address (x,y) that addresses a contone pixel 11 within the contone image 10, having a contone pixel value 12, which is usually an eight bit value ranging from 0 to 255. The contone pixel value 12 is fed into a comparator 25. At the same time, the address (i,j) is fed into the "modulo tile size unit" 40. Because in a preferred embodiment the threshold matrix 45 is periodical in a horizontal and vertical dimension, only one template of the complete screening function or the threshold matrix must be stored, comprising several halftone dots, and the (i,j) coordinates can be reduced to (0. . . TS) by a modulo operation on i and j, shown in block 40. TS is the tile size, giving the width and height of the threshold matrix 45. The resulting i'=mod(i,TS) and j'=mod(j,TS) values address in the threshold matrix 45 a threshold value 48, to be compared with the contone pixel value 12, within the comparator 25. As a result of this comparison, the recorder element or microdot 2 is turned "on" or "off". More information on the operation of the circuit described in FIG. 11 may be found in U.S. Pat. No. 5,155,599 (assigned to MILES Inc.). Signals according to the "on" or "off" state of the microdot 2 may now be sent to drive an exposing light beam of an imagesetter 50, such as SelectSet Avantra 25. SelectSet and Avantra are trade names of Miles Inc, Agfa Division in Massachusetts (U.S.A.).

The light beam may expose a graphical film of the type SFP812p, marketed by Agfa-Gevaert N.V. in Mortsel, Belgium. After exposure by a light beam modulated according to the halftone image, the film is developed and dried. This film is exposed in contact with a photo-sensitive lithographic printing plate precursor, also called imaging element. The imaging element is generally developed thereafter so that a differentiation results in ink accepting properties between the exposed and unexposed areas.

Imagewise exposure in accordance with the present invention may proceed by a scanwise exposure by means of e.g. Cathode Ray Tubes (CRT's), Light Emitting Diodes (LED-'s) or lasers, or by using a light source with a fiber optic transmission system.

Examples of lasers that can be used in connection with the present invention are e.g. HeNe lasers, Argon ion lasers, semiconductor lasers, YAG lasers e.g. Nd-YAG lasers etc.

In a further preferred embodiment of the present invention, said scanwise exposure is carried out by an exposure unit continuously or discontinuously moving across the imaging element during said scanwise exposure (cfr. FIGS. 6 & 7).

(iv) Preferred embodiments for making a lithographic printing plate

In a further preferred embodiment of the present invention, the imaging element contains a photosensitive layer. More specifically, imagewise exposure in accordance with the present invention may proceed by a scanwise exposure by means of e.g. a laser directly according to said screened data on a printing plate precursor (so-called computer to plate) or it may be performed by first exposing according to said screened data an intermediate photographic film of high contrast, generally a high contrast silver halide film, and then using the imaged photographic film as a mask for exposing a lithographic printing plate precursor to a conventional light source in a camera exposure or contact exposure. An example of such an intermediate photographic film (as imaging element) is marketed by Agfa-Gevaert NV under the name AGFASTAR.

Examples of photosensitive lithographic imaging elements are, for example, the silver salt diffusion transfer (generally referred to as DTR) materials disclosed in EP-A-410500, EP-A-483415, EP-A-423399, imaging elements having a photosensitive layer containing diazonium salts or a diazo resin as described for example in EP-A-450199, and imaging elements having a photosensitive layer containing a photopolymerizable composition as described for example in EP-A-502562, EP-A-491457, EP-A-503602, EP-A-471483 and DE-A-4102173.

A preferred method for making a lithographic printing plate from a contone original according to the present invention comprises an additional step of developing a thus obtained imagewise exposed imaging element.

One process for obtaining a lithographic printing plate by means of a DTR process uses an imaging element comprising, in the order given, a support with a hydrophilic surface such as a grained and anodized aluminium foil, a layer of physical development nuclei and a silver halide emulsion layer. An example of such an imaging element is marketed by Agfa-Gevaert NV under the name LITHOSTAR. The imaging element of the present embodiment is imaged using a scanning exposure followed by a development step in the presence of development agent(s) and silver halide solvent(s) so that a silver image is formed in the physical development nuclei layer. Subsequently the silver halide emulsion layer and any other optional layers are removed by rinsing the imaged element with water so that the silver image is exposed. Finally the hydrophobic character of the silver image is preferably improved using a finishing liquid comprising hydrophobizing agents. More technical details about said development may be found in e.g. EP-A-93.201.305.5 and U.S. Ser. No. 08/303,670 (both in the name of Agfa-Gevaert).

A second type of mono-sheet DTR material comprises on a support in the order given a silver halide emulsion layer and an image receiving layer containing physical development nuclei e.g. a heavy metal sulphide such as PdS. The image receiving layer is preferably free of binder or contains a hydrophilic binder in an amount of not more than 30% by weight. Subsequent to imagewise exposure, the mono-sheet DTR material is developed using an alkaline processing liquid in the presence of developing agents e.g. of the hydroquinone type and/or pyrazolidone type and a silver halide solvent such as e.g. a thiocyanate. Subsequently, the plate surface is neutralised with a neutralising liquid. Details about the constitution of this type of mono-sheet DTR material and suitable processing liquids can be found in e.g. EP-A-423399, U.S. Pat. No. 4501811, and U.S. Pat. No. 4784933. Lithographic printing plate precursors of this type are marketed by Agfa-Gevaert NV under the names SET-PRINT and SUPERMASTER.

It may also be clear that said scanwise exposing can be carried out by a light source with a visible spectrum or with an infrared spectrum or with an ultraviolet spectrum, depending on the actual imaging elements. Imaging elements suitable for DTR processing typically have a maximum sensitivity within the range of 400 to 800 nm, depending upon the nature of the imaging element. Thus, LITHOSTAR LAP-B has a maximum sensitivity at about 490 nm, LITHOSTAR LAP-O has a maximum sensitivity at about 550 nm, and SUPERMASTER imaging elements also have a maximum sensitivity at about 550 nm. Thus, the writing light beam 60 preferably has a wavelength within the range of 400 to 800 nm, such as from 450 to 600 nm.

Sensitivity spectra for imaging elements which can be used in the method according to the present invention may be found in the already mentioned EP-A-94.203.326.7.

Alternatively, a lithographic printing plate may be prepared from a "heat mode" recording material as a lithographic imaging element. Upon application of a heat pattern in accordance with image data and optional development the surface of such heat mode recording material may be differentiated in ink accepting and ink repellent areas. The heat pattern may be caused by a light source such as a laser. The heat mode recording material includes a substance capable of converting the light into heat. Heat mode recording materials that can be used for making a lithographic imaging elements are described for example in EP-A-92201633, DE-A-2512038, FR-A-1473751, Research Disclosure 19201 of April 1980 and Research Disclosure 33303 of January 1992.

In comparative experiments it has been proved that the present invention provides a method for making a lithographic printing plate with improved printing properties e.g. an extended tone scale in print and a smaller loss of the tone value, especially in the lower range of said scale in function of the number of printed copies.

In order to clearly demonstrate some remarkable advantages of the present invention, now the results of some experiments will be discussed.

The inventors have carried out many comparative experiments on 16 experimental shapes of halftone dots (which are illustrated in FIGS. 20.1 to 20.5.*b*.). In the further description of dedicated experiments, attention will be drawn mainly to the dot shapes illustrated in FIGS. 20.4 to 20.4.*d*. The results of experiments on dot shapes illustrated in FIGS. 20.1 to 20.3.*d*. and in FIGS. 20.5 to 20.5.*b*. are available at the inventor's laboratory, but are omitted from the present description in order to reduce the volume of the text and also in order not to confuse the reader.

Figure 21:
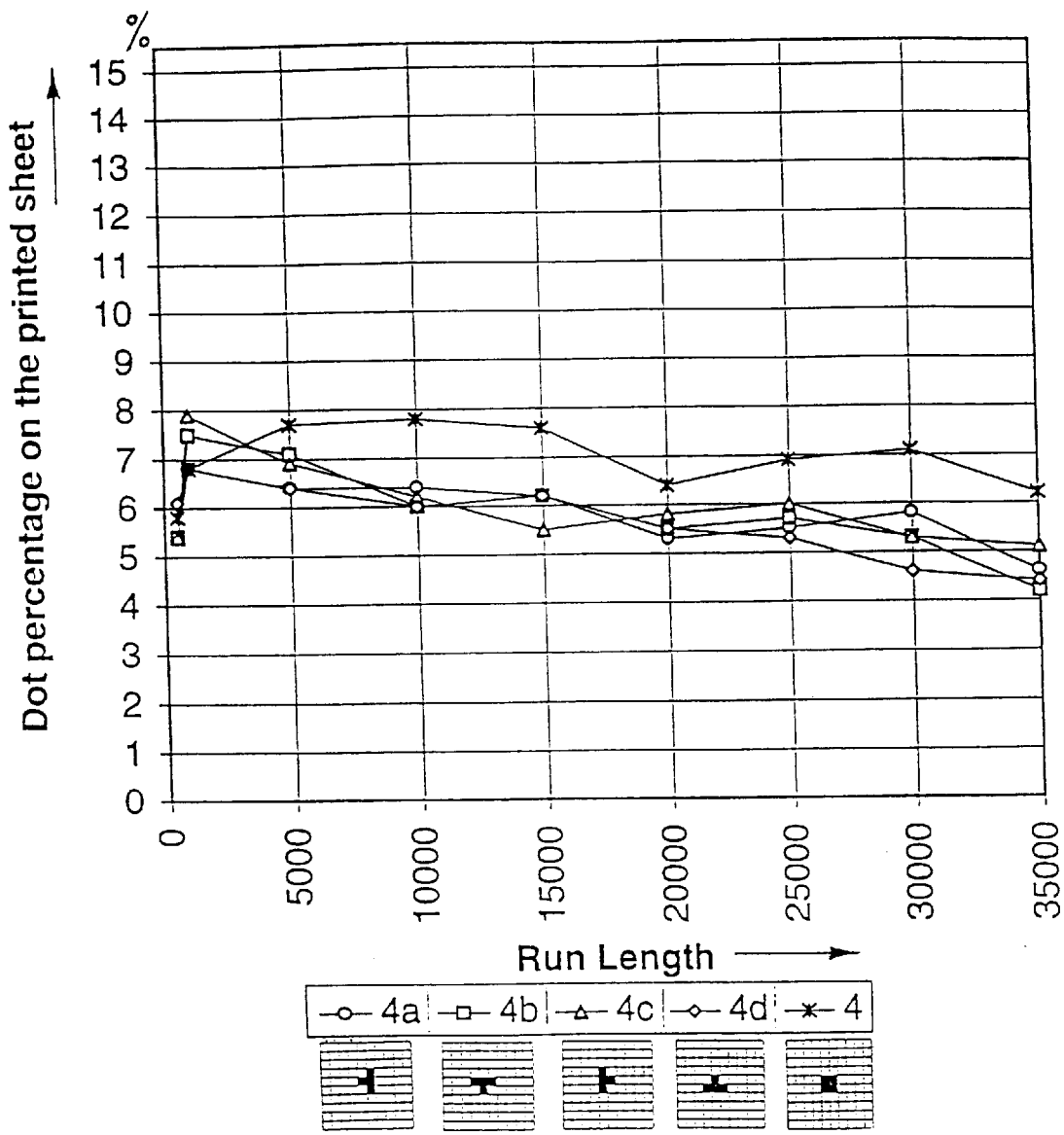
FIG. 21 shows comparative experiments of five different shapes of halftone dots, including compact shapes according to the present invention, demonstrating printing properties in the lower range of the tone scale in function of the number of printed copies.

In a further instance, the dot shapes of FIG. 20.4 to 20.4.*d* thus are effectively used in comparative experiments, the results of which are discussed in reference to FIG. 21.

In FIG. 21 an experiment with 5 different dot shapes (namely the same as indicated in FIGS. 20.4 to 20.4.*d*.), was carried out at a resolution of 1200 dpi.

Comparative printing plates Lithostar LAP-O were exposed on an imagesetter SelectSet 7000 modified with a green HeNe-laser (593 nm) and, thereafter, were developed in a developing apparatus Lithostar LP82 with appropriate processing liquids, comprising developing liquid G5000B and finishing liquid G5300B, each available from Agfa-Gevaert NV.

Printing plates were printed on a conventional printing press Heidelberg GTO 52 equiped with a Dahlgren dampener. The ink used was a K+E 171; the dampening liquid used was 100% Rotafluid (commercially available from Rotaprint). Prints were made on matt-coated-paper of 90 g/m². During the calibration of the press, a density of 1.75 (FOGRA standard) on solid areas was maintained.

On the prints obtained by comparative experiments described in FIGS. 20 and 21, the size of the dots was evaluated visually and the densities were measured with a Macbeth RD918 densitometer according to the Murray-Davies formula.

After 35000 prints, the following results were observed (amongst others): at least at 1200 dpi it is proven that a square dot shape (here indicated by FIG. 20.4) gives the best printing results, comprising a smaller loss of the tone value, especially in the lower range of said scale (here e.g. aboutr 8%) in function of the number of printed copies.

FIG. 4.1 to 4.2 represent enlarged views of comparative autotypical screenings at 1200 dpi-120 lpi, under 45° and 15° carried out according to the nearest prior art ABS (FIG. 4.1) and according to the present invention (FIG. 4.2). More in particular, FIGS. 4.1.*a* to 4.2.*b*, represent results (for sake of greater perceptibility magnified by a factor of nearly 22×) of autotypical screening at an addressability of 1200 dpi, a ruling of 120 lpi and raster angles of 45° (cfr. left side figures, with appendix a) and of 15° ((cfr. right side figures, with appendix b). FIGS. 4.1 (both *a* and *b*) represent results at a coverage of 4%, according to known method ABS of autotypical screening (described before, cfr. FIG. 13); whereas FIGS. 4.2 (both *a* and *b*) represent results at a coverage of 4%, after autotypical screening according to the present invention.

From this FIG. 4 it may be very clear, that dot shape is now constant, that the area-to-perimeter ratio of printed dots now is minimal, even under different angles (as e.g. under 45° or under 15°, etc).

In a further preferred embodiment of the present invention, a dedicated mixing of different compact dot-shapes may be applied in order to represent a specific tone level. Supposing that a halftone dot theoretically should contain exactly 41 microdots, no strict rectangular dotshape could be guaranteed. Now, in the present embodiment, a balanced mixing of e.g. a rectangular halftone dot comprising 40 microdots and a rectangular halftone dot of 42 microdots should render a tone level corresponding with 41 (theoretical) microdots.

In another further preferred embodiment of the present invention, a dedicated deviation of a compact dotshape may be accepted in a well defined region of the tone scale, this in order to represent a specific tone level. So, in the present embodiment not all real dotshapes over the whole tone scale would be theoretical rectangular.

In view of both foregoing paragraphs, it may be stated that the theoretical number of microdots comprised within a halftone dot is given by the formula $$\text{\# microdots} = \text{coverage } (\%) \cdot \frac{\text{recorder resolution}^2 \text{ (dpi)}^2}{\text{ruling}^2 \text{ (lpi)}^2}$$

Hereabove, the extreme regions of the tone scale mainly comprise highlight tones lower than 15% coverage and/or shadow tones higher than 85% coverage.

In a further embodiment a halftone dot comprises at least 16 microdots; in a second further embodiment a halftone dot comprises at least 10 microdots; in a third further embodiment a halftone dot comprises at least 4 microdots.

In a still further preferred embodiment said imaging element is a lithographic printing plate precursor having a surface capable of being differentiated in ink accepting and ink repellant areas upon scanwise exposure and a development step.

In a further preferred embodiment of the present invention said lithographic printing plate precursor contains a silver halide emulsion layer and an image receiving layer containing physical development nuclei and wherein subsequent to said scanwise exposure said lithographic printing plate precursor is developed using an alkaline processing liquid in the presence of developing agent(s) and silver halide solvent(s).

In a further preferred embodiment of the present invention said printing plate precursor contains on a hydrophilic surface of a support in the order given a layer of physical development nuclei and a silver halide emulsion layer and wherein subsequent to said scanwise exposure said lithographic printing plate is developed using an alkaline processing solution in the presence of a developing agent and a silver halide solvent and subsequently treating said developed printing plate precursor to remove the layer(s) on top of said image receiving layer, thereby uncovering said silver image formed in said image receiving layer.

In a further preferred embodiment of the present invention said hydrophilic surface of a support comprises a grained and anodized aluminum foil.

In a still further preferred embodiment of the present invention a printing plate is obtained by any of the methods mentioned before.

(v) Further applicability of the present invention

The method described in this invention improves the faithful rendition of small dots by selective correction of small exposure areas, thus eliminating the need for tightly controlled spot sizes or materials with high gradients. This implies that the correction method described in this invention can be applied to improve the output quality of less expensive laser recorders and direct to plate exposure systems, exposing plates which do not have the steep gradient and short toe characteristics of graphic arts films.

It may be noticed that the problem of insufficient quality, particulary of tone range in the final print, arises especially with imaging elements which are sensitive to edge-sharpness defects.

As may be clear from the description given before, a selective distortion correction, which adjusts only small dots (cfr. highlights) or small holes (cfr. shadows) and has no effect on large dots (cfr. midtones), allows to improve the halftone rendition so that an optimum number of tone levels can be obtained on film, paper or plates. The present invention provides a method for generating a screened reproduction of a contone image with a minimized loss of tonal range in the light tints due to dot loss and in the dark tints due to dot gain. It also provides an improved halftone rendition so that an optimum number of tone levels can be obtained on film or plates.

By the technical features of the present invention, also an advantageous effect is achieved that the tone rendering of reproductions is more predictable as from the start of the printing process and the endurance of a printing plate is substantially increased, without loss of quality in the output image.

Vareous modifications will become possible for those skilled in the art after receiving the teachings of the present disclosure without departing from the scope thereof.

So, for example, in a method according to the present invention said scan-wise exposure may be carried out using a laser or by using LED's or by using a light source with a fiber optic transmission system.

As to the description of the halftone generator illustrated in FIG. 11, it may be remarked that, in another embodiment within the same scope of protection, the contone image 10 may be brought at the correct orientation and scale before the screening effectively starts, such that the scaling and rotation unit 35 is superfluous, and each contone pixel 11 is addressed directly by the (i,j) address.

In an imagesetter relative to the present invention, a so-called "raster image processor" (RIP) builds a binary bitmap image in memory, representing tone values, before sending the information as individual scan lines to the exposure unit. The presence of small dot areas, negative or positive, in the bitmap image can easily be detected by a special algorithm to be included (by software or by hardware implementation) in the bitmap creation functions of the RIP.

It was mentioned before that contone image signals preferably have values from 0 to 255 (or 1 to 256), whereas the halftone image signals preferably have lower values (generally only 2). But, for example, the images that can be processed range from 1 bit pro pixel pure binary halftone images to 10 or 12 (or even more) bits per pixel per color to represent high quality contone images.

In case of a color image, the above described screening process is performed on each of the color separations of the image. Preferably the color image is separated in its Yellow, Magenta, Cyan and Black components. Each of these components may then be screened and used to imagewise expose four lithographic printing plate precursors according to the present invention. Four lithographic printing plates, one for each color separation, will thus be obtained. The color separations can then be printed over each other in register in a lithographic printing machine using the four plates.

Although the current description primarily discussed rectangular or square screen cells, for people skilled in the art, also parallelogram shaped screen cells, or screen cells having a hexagonal, or a rhomboidal shape can be applied according to the methods of the present invention.

It may be remarked that hexagonal, rhomboidal and other forms of screen cells are described e.g. in "Digital halftoning", R. Ulichney, MIT-Press, Cambridge (U.S.A.)-London (G.B.), 1987; whereas the use of triangles in polygon rasterization is disclosed e.g. in WO 94/10647 (applicant S-MOS Systems Inc.).

Whereas the present description has been oriented mainly to lithographic printing plates, also applications within other technical fields are possible, e.g. flexography, screen printing, electrography, etc. In electrophotography the above mentioned imaging element contains a photosensitive layer which is a photoconductor.

The present invention may be applied as well to positive imaging systems as to negative imaging systems.

We claim:

1. A method for generating a screened reproduction of a multiple tone image comprising the steps of:
    autypical screening said multiple tone image to obtain screened data representing tones of said multiple tone image in terms of halftone dots;
    reproducing said halftone dots on an imaging element by means of a scan-wise exposure having a fast scan direction; and
    shaping said halftone dots such that they have a longer and a shorter dimension and a shape which is compact, in said fast scan direction, by having said shorter dimension aligned along said fast scan direction and such that they have a ratio of peripheral length to surface area which is minimal, at least in extreme regions of a tone scale.

2. A method according to claim 1, wherein said scan-wise exposure is carried out using a laser or a LED.

3. A method according to claim 2, wherein the shape of said halftone dots is square or rectangular.

4. A method according to claim 3, wherein said extreme regions of the tone scale comprise at least one of highlight tones lower than 15% coverage and shadow tones tones higher than 85% coverage.

5. A method according to claim 3, wherein a halftone dot comprises at least 4 microdots.

6. A method according to claim 1 wherein said imaging element contains a photosensitive layer.

7. A method according to claim 6 wherein said imaging element is a lithographic printing plate precursor having a surface capable of being differentiated in ink accepting and ink repellant areas upon scan-wise exposure and a development step.

8. A method according to claim 7 wherein said lithographic printing plate precursor contains a silver halide emulsion layer and an image receiving layer containing physical development nuclei and wherein subsequent to said scan-wise exposure said lithographic printing plate precursor is developed using an alkaline processing liquid in the presence of at least one developing agent and at least one silver halide solvent.

9. A method according to claim 8 wherein said printing plate precursor contains on a hydrophilic surface of a support in the order given a layer of physical development nuclei and a silver halide emulsion layer and wherein subsequent to said scan-wise exposure said lithographic printing plate is developed using an alkaline processing solution in the presence of a developing agent and a silver halide solvent and subsequently treating said developed printing plate precursor to remove at least one layer on top of said image receiving layer, thereby uncovering said silver image formed in said image receiving layer.

10. A method according to claim 9 wherein said hydrophilic surface of a support comprises a grained and anodized aluminum foil.

11. A printing plate obtained by the method according to claim 1.

12. The method of claim 1, wherein said shape of said halftone dots is rectangular with a non-unity aspect ratio.

13. The method of claim 1, furthers comprising the additional step of performing a dedicated mixing of different compact halftone dot shapes to represent a specific tone level requiring a theoretical number of microdots which cannot be used to produce a single type of halftone dot having a desired shape.

14. The method of claim 13, wherein said dedicated mixing step comprises mixing first and second rectangular halftone dot shapes to represent a tone level requiring a number of microdots not amenable to formation in a pure rectangular shape.

15. The method of claim 1, further comprising the additional step of performing localized phase distortion of said halftone dots in said extreme regions of said tone scale.

16. A method for generating a screened reproduction of a multiple tone image comprising the steps of:
   autotypical screening said multiple tone image to obtain screened data representing tones of said multiple tone image in terms of halftone dots;
   reproducing said halftone dots on an imaging element by means of a scan-wise exposure;
   shaping said halftone dots such that they have a shape which is compact by having a ratio of peripheral length to surface area which is minimal, at least in extreme regions of a tone scale; and
   performing a dedicated mixing of different compact halftone dot shapes to represent a specific tone level requiring a theoretical number of microdots which cannot be used to produce a single type of halftone dot having a desired shape.

* * * * *

UNITED STATES PATENT AND TRADEMARK OFFICE
CERTIFICATE OF CORRECTION

PATENT NO. : 5,884,013
DATED : March 16, 1999
INVENTOR(S) : Jacobus Bosschaerts, et al.

It is certified that error appears in the above-identified patent and that said Letters Patent is hereby corrected as shown below:

On the title page, insert the following item:

--[60] Provisional Application No. 60/009,574 Jan. 3, 1996 --.

Column 1, line 4, insert the following:
 --CROSS REFFERENCE TO RELATED APPLICATION
Reference is made to and priority claimed from U.S. provisional application Ser. No.60/009,574, filed Jan. 3, 1996.--

Signed and Sealed this

Eighteenth Day of July, 2000

Attest:

Q. TODD DICKINSON

*Attesting Officer*     *Director of Patents and Trademarks*